(12) United States Patent
Warashina et al.

(10) Patent No.: US 6,754,963 B2
(45) Date of Patent: Jun. 29, 2004

(54) PLANT CUTTER APPARATUS (75) Inventors: Makoto Warashina, Wako (JP); Hiroaki Uchitani, Wako (JP); Hideshi Sasaki, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 19 days.

(21) Appl. No.: 10/078,874

(22) Filed: Feb. 19, 2002

(65) Prior Publication Data

US 2002/0121022 A1 Sep. 5, 2002

(30) Foreign Application Priority Data

Mar. 1, 2001 (JP) ........................................ 2001-056528

(51) Int. Cl.$^7$ ................................................ A01G 3/06
(52) U.S. Cl. ........................ 30/276; 56/12.7; 192/13 R; 403/365; 267/141.2
(58) Field of Search ........................ 30/276, 275, 381, 30/295, 390, 240; 192/13 R, 18 B, 15 BA; 56/12.7, 11.8, 11.3, 225, 295, 127; 220/780, 781–793, 6; 267/141.2; 403/329, 372, 225, 366, 365, 228

(56) References Cited

U.S. PATENT DOCUMENTS

| | | | | |
|---|---|---|---|---|
| 4,006,528 A | * | 2/1977 | Katsuya ........................ 30/276 |
| 4,114,460 A | * | 9/1978 | Oto ............................. 277/636 |
| 4,286,675 A | * | 9/1981 | Tuggle ........................ 173/213 |
| 4,586,322 A | * | 5/1986 | Yokocho et al. .............. 56/12.7 |
| 4,702,483 A | * | 10/1987 | Ukai et al. ................... 277/636 |
| 4,759,128 A | * | 7/1988 | Katoh et al. .................. 30/276 |
| 4,819,742 A | * | 4/1989 | Driggers ................... 173/162.2 |
| 4,841,929 A | * | 6/1989 | Tuggle et al. ............ 123/198 E |
| 5,845,757 A | * | 12/1998 | Csonka ................. 192/105 BA |
| 5,855,069 A | * | 1/1999 | Matsubayashi et al. ....... 30/276 |
| 6,021,630 A | * | 2/2000 | Higashi et al. ............... 56/11.3 |
| 6,167,973 B1 | * | 1/2001 | Nagashima .................. 173/221 |
| 6,213,677 B1 | * | 4/2001 | Yamane et al. ............. 403/329 |
| 6,494,496 B1 | * | 12/2002 | Sweeney .................... 285/115 |
| 2002/0078671 A1 | * | 6/2002 | Hiratsuna et al. ............ 56/11.8 |

FOREIGN PATENT DOCUMENTS

JP 51064732 5/1976
JP 61146121 9/1986

OTHER PUBLICATIONS

Patent Abstracts of Japan, vol. 1997, No. 11, Nov. 28, 1997, publication No. 09187137, publication date Jul. 22, 1997.

* cited by examiner

*Primary Examiner*—Allan N. Shoap
*Assistant Examiner*—Ghassem Alie
(74) *Attorney, Agent, or Firm*—Adams & Wilks (57) ABSTRACT

A plant cutter apparatus has a tubular handling rod having a first end portion and a second end portion. A drive shaft extends through the handling rod and is mounted for undergoing rotation. A drive source unit is mounted on the first end portion of the handling rod for rotationally driving the drive shaft. A cutter blade is connected to the drive shaft for rotation therewith. A clutch case has a first mounting portion connected to the first end portion of the handling rod, a flexible coupling portion extending from the first mounting portion toward the drive source unit, and a second mounting portion extending from the flexible coupling portion and connected to drive source unit. The second mounting portion has an axial fitting hole for receiving the first end portion of the handling rod so that the first end portion of the handling rod is axially slid able therein. The first mounting portion, the flexible coupling portion and the second mounting portion of the clutch case extend sequentially along an axis of the drive shaft when viewed in a direction from the cutting blade toward the drive source unit.

16 Claims, 7 Drawing Sheets

PLANT CUTTER APPARATUS

FIELD OF THE INVENTION

The present invention relates to an improvement in plant cutter apparatus of a type where a cutter blade mounted at the distal end of a handling rod is driven by a prime mover or drive source unit.

Generally, weeds growing on footpaths between rice fields etc. Have to be cut several times a year because they tend to be nested by pests. The weed cutting is usually very laborious, and thus various automatic weed cutters have heretofore been proposed and put to practical use, among which shoulder-hung weed cutters are very popular because of their small size and handling ease. In most of the shoulder-hung weed cutters, a driving-force transmission shaft or drive shaft, which is passed through a pipe-shaped handling rod, is rotated via an engine provided at one end of the handling rod so as to rotate a cutter blade provided at the other end of the handling rod. Inmost cases, a human operator hangs the weed cutter on his or her shoulder using a hanging belt, and cuts weeds with the rotating cutter blade by gripping a U-shaped handle provided on an intermediate position of the handling rod to swing the handling rod in front-and-rear and left-and-right directions.

In recent years, there have been strong demands for further improvements in agricultural working environment. In the case of the shoulder-hung weed cutters too, there is an increasing demand for reduction in vibrations that are transmitted from the engine via the handling rod to the U-shaped handle, with a view to lowering the load on the human operator.

Particularly, in the weed cutters where the cutter blade is rotated by the engine via the drive shaft, the vibrations that are transmitted from the engine to the handling rod would present great vibrating amplitude in the rotating direction of the drive shaft. Thus, it is known that minimizing the vibrations in the rotating direction can effectively contribute to reduction of the undesired vibrations transmitted to the handle and hence to the human operator.

Weed cutters arranged to reduce the vibrations transmitted from the engine to the handling rod are known, for example, from Japanese Utility Model Laid-open Publications Nods. 51-64732 and 61-146121. In the weed cutter disclosed in the 51-64732 publication, the engine is mounted, via a clutch housing, at one end of the handling rod through which the drive shaft is passed, and the clutch housing has accommodated therein a clutch operating between the output shaft of the engine and the drive shaft. Further, in the disclosed weed cutter, a connection pipe is secured to the one end of the handling rod and extends toward the engine, and a vibration isolation member is interposed between opposed surfaces of the connection pipe and clutch housing. Thus, the engine is supported by the handling rod via the vibration isolation member in such a manner that vibrations transmitted from the engine to the handling rod can be decreased by means of the vibration isolation member. Namely, the vibration isolation member has two functions: the function of supporting the engine; and the function of attenuating the vibrations transmitted from the engine to the handling rod. In order to enhance or more effectively perform the engine supporting function, the vibration isolation member has to have greater rigidity, which means it is preferable that the vibration isolation member have smaller flexibility. On the other hand, in order to enhance or more effectively perform the vibration isolating function, it is preferable that the vibration isolating member have greater flexibility. Because the vibration isolating function thus tends to be directly influenced by, or correlated with, the engine supporting function, the weed cutter would encounter significant limitations in performing the vibration isolating function.

In the weed cutter disclosed in the 61-146121 publication, the engine is mounted, via a bellows-shaped or tapered vibration isolation member, at one end of the handling rod through which the drive shaft is passed, and the vibration isolation member has accommodated therein a clutch operating between the output shaft of the engine and the drive shaft. Here, the engine is supported by the handling rod via the vibration isolation member in such a manner that vibrations transmitted from the engine to the handling rod can be decreased by means of the vibration isolation member. Because the engine is supported by the handling rod via the vibration isolation member, this disclosed weed cutter can not perform a sufficient vibration isolating function as with the cutter disclosed in the first-mentioned 51-64732 publication.

SUMMARY OF THE INVENTION

In view of the foregoing, it is an object of the present invention to provide a plant cutter apparatus which can minimize vibrations transmitted from a drive source unit to a handling rod.

According to the present invention, there is provided an improved plant cutter apparatus of a type which comprises a pipe-shaped handling rod; a drive shaft passed through the pipe-shaped handling rod, a clutch case mounted on one end portion of the handling rod, a drive source unit mounted on the one end portion of the handling rod via the clutch case, and a cutter blade mounted on another end portion of the handling rod for being rotated by rotation, via the drive source unit, of the drive shaft. In the present invention, the clutch case is an integrally-formed, one-piece component part which includes a handling-rod mounting portion coupled to the one end portion of the handling rod, a flexible coupling portion formed to have given flexibility and extending from the handling-rod mounting portion toward the drive source unit, and a drive-source mounting portion extending from the flexible coupling portion and coupled with the drive source unit. The drive-source mounting portion has an axial loosely-fitting hole receiving the one end portion of the handling rod, inserted via the handling-rod mounting portion, in a loosely-fitting engagement such that the one end portion is slid able in an axial direction, and an abutting face or region formed on the way through the loosely-fitting hole for abutting engagement with the end surface of the one end portion.

In the present invention, the clutch case is characterized in that the function of supporting the drive source unit such as an engine and the function of attenuating vibrations transmitted from the drive source unit to the handling rod are performed independently of each other; namely, the clutch case can perform the drive-source supporting function and vibration isolation function separately without an operating correlation between the two functions. Specifically, the drive-source mounting portion can be supported in the axial direction with the end surface of the handling rod abutting against the abutting region of the drive-source mounting portion. The drive source unit is allowed to vibrate about the one end portion of the handling rod supporting the unit. Because the drive source unit is supported by the end surface of the handling rod as noted above, there is no need for the flexible coupling portion to support the drive source unit, so that the flexible coupling portion can fully perform its vibration attenuation function independently of, or without being influenced by, the drive-source supporting function. In the above-described manner, the present invention can significantly reduce the undesired vibrations that are transmitted from the drive source unit to the handling rod while at the same time allowing the rod to reliably support the unit. Further, because the clutch case is an integrally-formed one-piece component, it can decrease the number of parts of the cutter apparatus and thus simplify the construction of the cutter apparatus.

In a specific embodiment, the loosely-fitting hole tapers off toward the abutting region.

In a specific embodiment, the flexible coupling portion has a plurality of circumferential slits each formed in part of a circumference of the flexible coupling portion and communicating with an axial through-hole of the flexible coupling portion, and the plurality of circumferential slits are staggered along the axial direction of the flexible coupling portion. The provision of such circumferential slits allows the flexible coupling portion to have the given flexibility.

BRIEF DESCRIPTION OF THE DRAWINGS

Certain preferred embodiments of the present invention will hereinafter be described in detail, by way of example only, with reference to the accompanying drawings, in which.

DETAILED DESCRIPTION OF THE PREFERRED EMBODIMENTS

Figure 1:
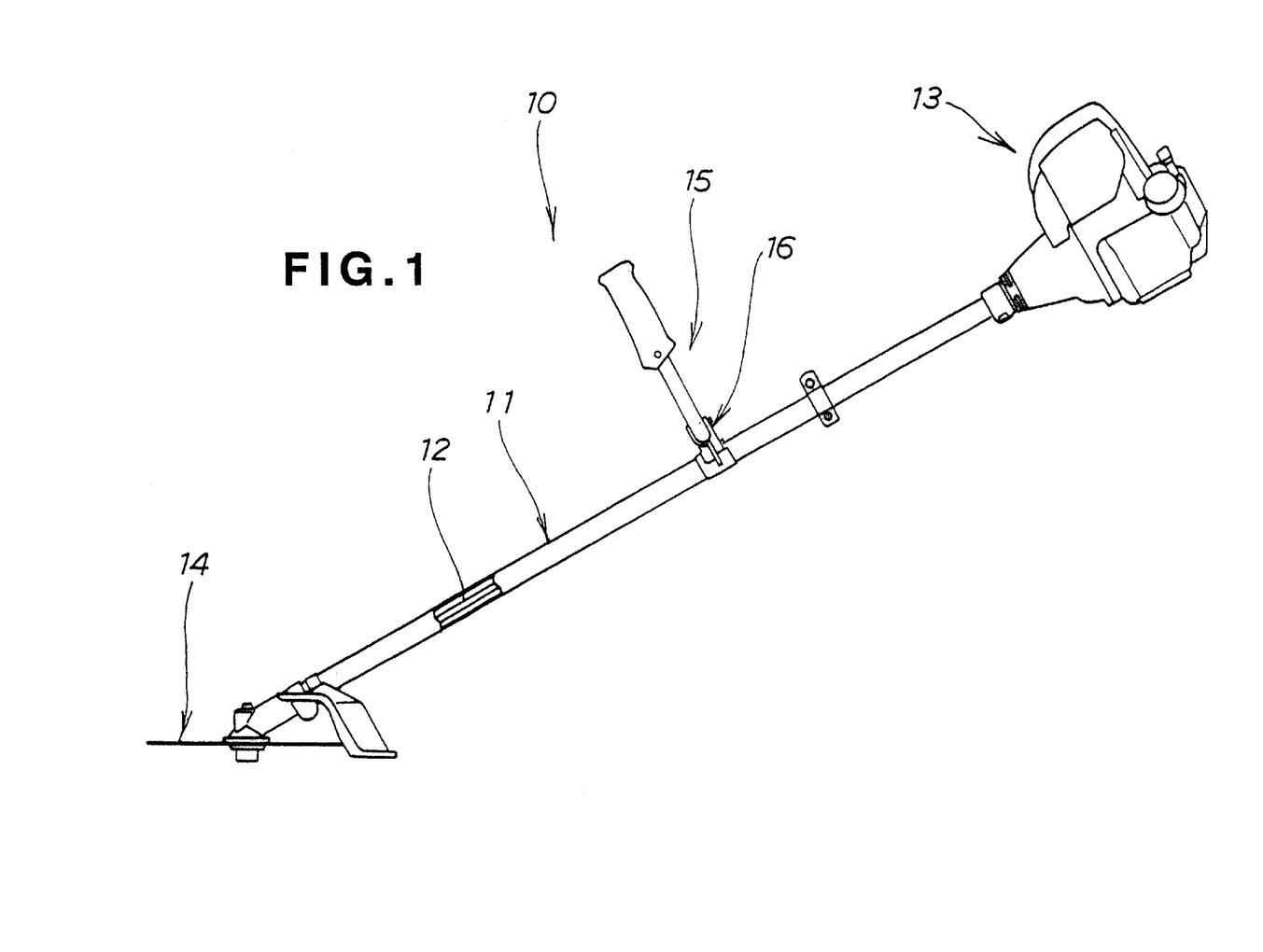
FIG. 1 is a side view showing a plant cutter apparatus in accordance with an embodiment of the present invention.
Figure 2:
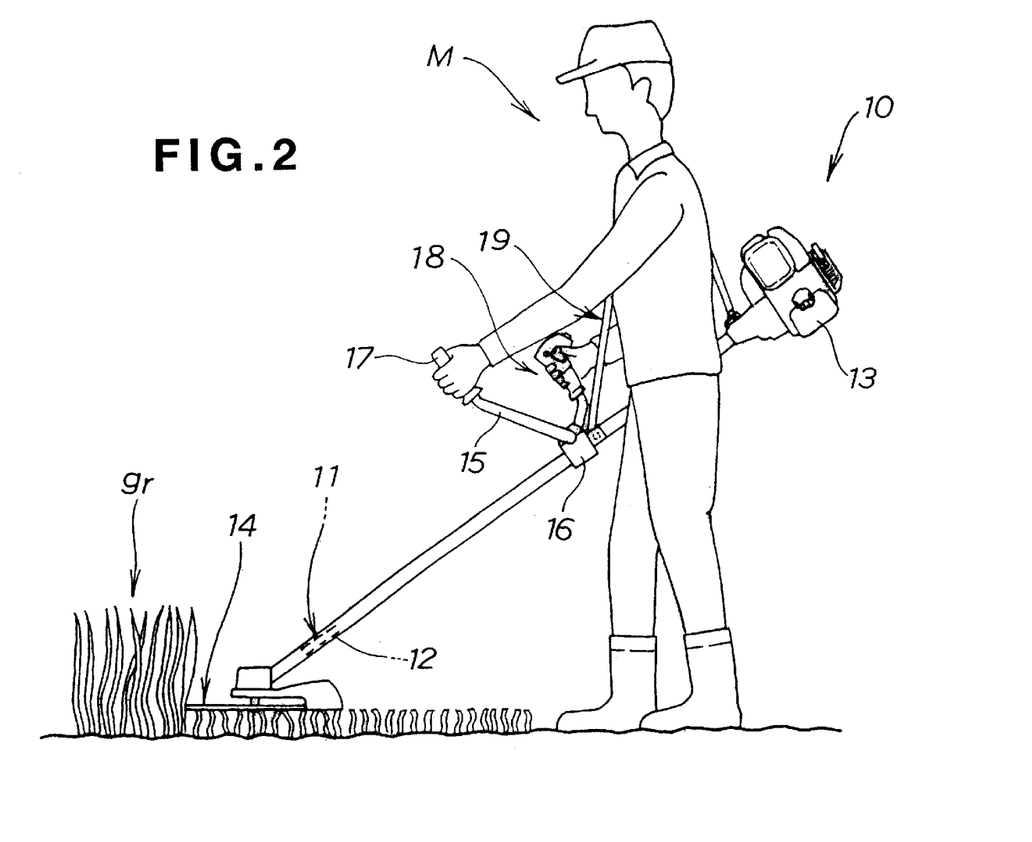
FIG. 2 is a view explanatory of a manner in which the plant cutter apparatus of FIG. 1 is used to cut weeds.

FIGS. 1 and 2 show a plant cutter apparatus 10 in accordance with an embodiment of the present invention that is designed to cut unwanted plants such as bushes, weeds or grass. The plant cutter apparatus 10 includes a pipe-shaped handling rod 11, a driving-force transmission shaft or drive shaft 12 longitudinally passed through the handling rod 11, a prime mover or drive source unit 13, such as an engine or electric motor, mounted at one end of the handling rod 11, and a cutter blade 14 mounted at the other end of the handling rod 11. The drive shaft 12 can be rotated by activation of the drive source unit 13 so that the cutter blade 14 can be rotated by the drive source unit 13 via the drive shaft 12. The plant cutter apparatus 10 also includes a U-shaped handle 15 that is mounted on the handling rod 11 substantially at a longitudinally-middle portion thereof. Specifically, the handle 15 is fixed to the handling rod 11 by means of a handle holder 16, and has left and right grips 17 and 18. The right grip 18 of the handle 15 is an operator member provided with a throttle lever and lock lever for controlling the drive source unit 13.

As seen in FIG. 2, a human operator M can shoulder the plant cutter apparatus 10 on his or her shoulder using a hanging belt 19 secured at its opposite ends to intermediate portions of the handling rod 11. The human operator M can cut weeds gr by causing the cutter blade 14 to rotate via the drive source unit 13 while swinging the cutter blade 14 in front-and-rear and left-and-right directions using the grips 17 and 18.

Figure 3:
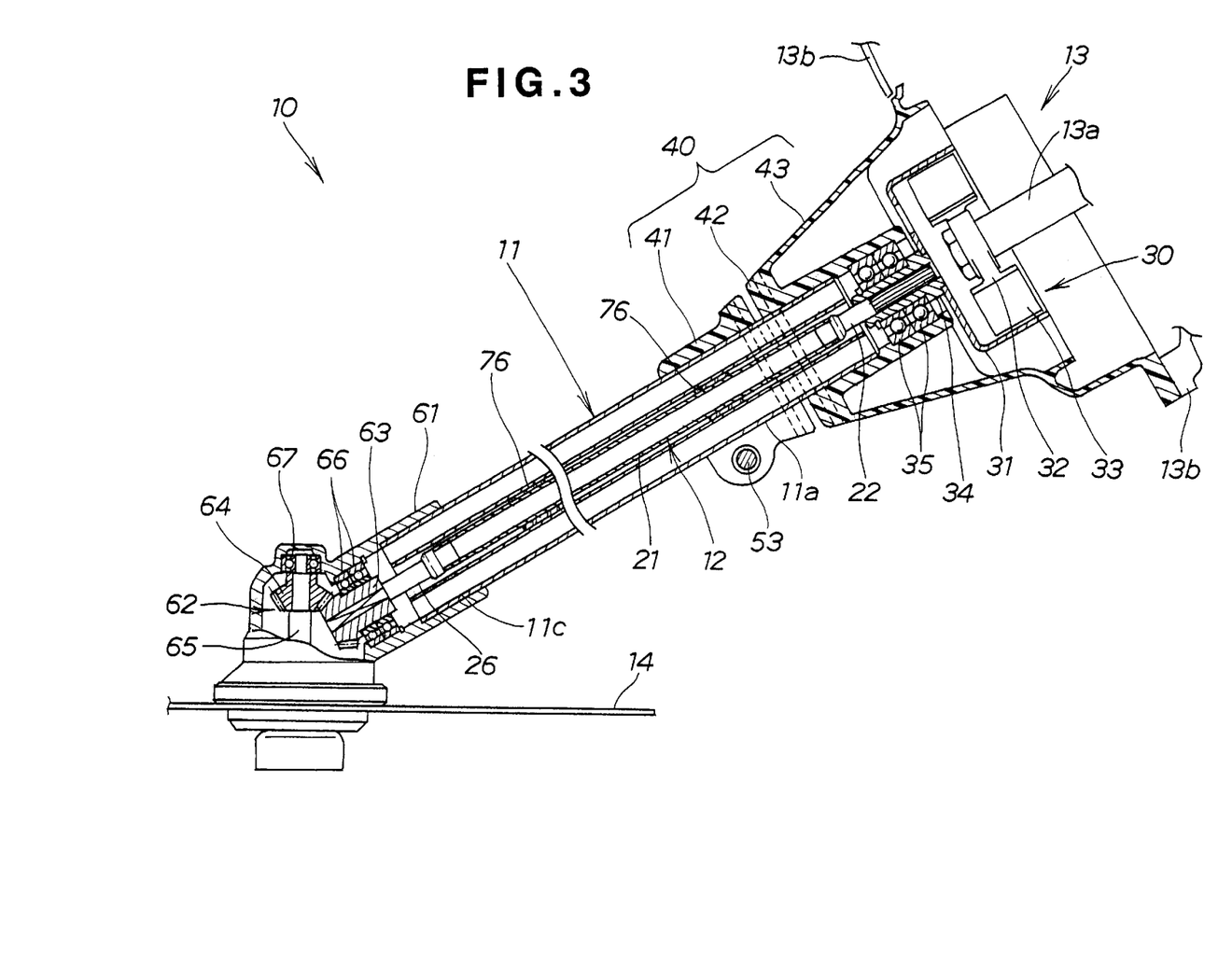
FIG. 3 is an enlarged sectional view of the plant cutter apparatus of FIG. 1.

FIG. 3 is a sectional view of the plant cutter apparatus 10, which particularly shows a clutch mechanism 30 that is accommodated in a clutch case 40 and provided between the drive shaft 12 and an output shaft 13a of the drive source unit 13. Namely, the drive source unit 13 is mounted at the one end of the handling rod 11 via the clutch case 40. In the plant cutter apparatus 10, the handling rod 11 and drive shaft 12 are positioned co-axially with the output shaft 13a of the drive source unit 13.

The drive shaft 12 is a "different-metal-combined shaft", which is made of a combination of different kinds of metals. Specifically, the drive shaft 12 includes a pipe-shaped main shaft portion 21 made of a titanium alloy, a drive-side end shaft portion 22 secured to one end of the pipe-shaped main shaft portion 21, and a cutter-side end shaft portion 26 secured to the other end of the main shaft portion 21; both of the drive-side end shaft portion 22 and cutter-side end shaft portion 26 are made of steel.

The clutch mechanism 30 is a centrifugal clutch, which includes a clutch drum 31 that is spline-coupled with the drive-side end shaft portion 22 of the drive shaft 12, a rotation member 32 connected to the output shaft 13a of the drive source unit 13 and a clutch member 33 that brings the rotation member 32 into engagement with the clutch drum 31 only when the rotation member 32 is turning at high speed. The clutch drum 31 is a cup-shaped member surrounding the rotation member 32.

The clutch case 40 is an integrally-molded component part made of a resin material, which includes a handling-rod mounting portion 41 coupled with one end portion 11a of the handling rod 11, a flexible coupling portion 42 having given flexibility and extending from the handling-rod mounting portion 41 toward the drive source unit 13 and a drive-source mounting portion 43 extending from the flexible coupling portion 42 toward the drive source unit 13 and coupled with the drive source unit 13. The clutch case 40 is preferably made of nylon resin having fiberglass mixed therein.

The above-mentioned handling-rod mounting portion 41 and drive-source mounting portion 43 have greater rigidity than the flexible coupling portion 42, so as to reliably support the handling rod 11 and drive source unit 13. The flexible coupling portion 42 has relatively small rigidity so that it has such flexibility as to effectively attenuate vibrations of the drive source unit 13. The drive-source mounting portion 43 is bolted to a case 13b of the drive source unit 13.

Because the clutch case 40 is a one-piece component part integrally molded to provide the handling-rod mounting portion 41, flexible coupling portion 42 and drive-source mounting portion 43, it can decrease the number of parts of the cutter apparatus and thus simplify the construction of the cutter apparatus.

The cutter blade 14 is rotatably connected to the other end 11c of the handling rod 11 via a transmission mechanism case 61. The transmission mechanism case 61 accommodates therein a transmission mechanism 62 disposed between the drive shaft 12 and the cutter blade 14. The transmission mechanism 62 includes a driving bevel gear 63 connected to the cutter-side end shaft portion 26, a driven bevel gear 64 meshing with the driving bevel gear 63, and a driven shaft 65 having mounted thereon the driven bevel gear 64 and cutter blade 14.

The drive shaft 12 is rotatably supported at a plurality of positions thereof spaced from each other in its longitudinal direction, as described below.

First, the one end portion of the drive shaft 12 is rotatably supported by the drive-source mounting portion 43 via a boss 34 and a plurality of bearings 35. Specifically, the drive-side end shaft portion 22 of the drive shaft 12 is spline-coupled to the boss 34 of the clutch drum 31, and the boss 34 is supported via the plurality of bearings 35.

Second, the other end portion of the drive shaft 12 is rotatably supported by the transmission mechanism case 61 via the driving bevel gear 63 and a plurality of bearings 66. Specifically, the cutter-side end shaft portion 26 of the drive shaft 12 is coupled with the driving bevel gear 63, and the driving bevel gear 63 is supported via the plurality of bearings 66.

Third, an intermediate portion of the drive shaft 12 between the drive-side end shaft portion 22 and the cutter-side end shaft portion 26 is rotatably supported by the handling rod 11 via a plurality of bushings 76 provided on the drive shaft 12 and spaced from each other at uniform intervals in the longitudinal direction thereof. Note that reference numeral 67 in FIG. 3 represents bearings for supporting the driven shaft 65.

FIGS. 4 to 8 shows how the handling rod 11 and clutch case 40 are coupled each other.

Figure 4:
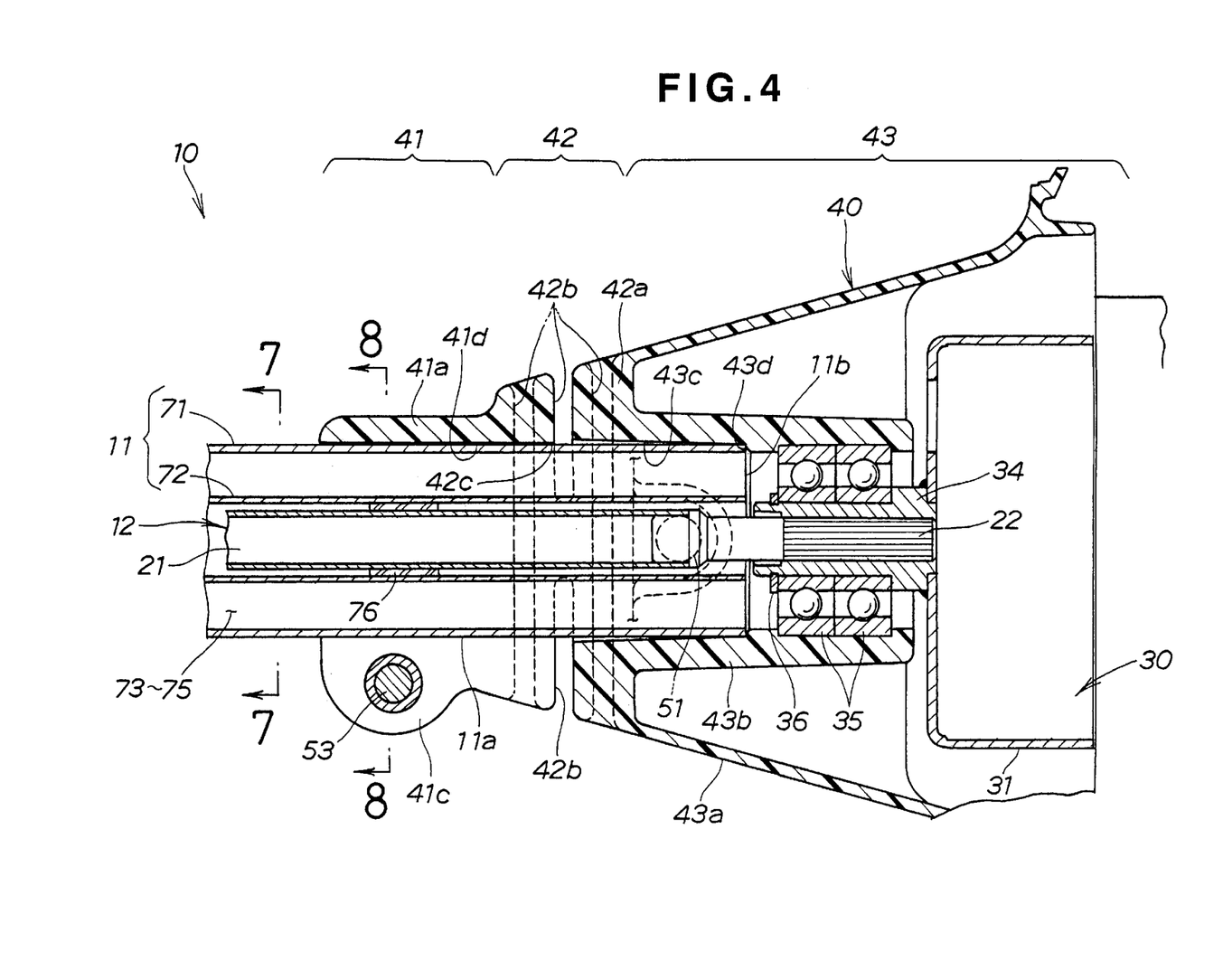
FIG. 4 is an enlarged sectional view of the plant cutter apparatus, which particularly shows how a handling rod and clutch case of FIG. 3 are coupled with each other.

As clearly seen in FIG. 4, the handling-rod mounting portion 41 and flexible coupling portion 42 together constitute a cylinder in which the one end portion 11a of the pipe-shaped handling rod 11 is inserted. The drive-source mounting portion 43 has a tapered outer cylindrical portion 43a increasing in diameter in a direction toward the clutch mechanism 30, and an inner cylindrical portion 43b integrally formed with the tapered outer cylindrical portion 43a in concentric relation thereto. The inner cylindrical portion 43b has an axial loosely-fitting hole 43c, and it also has an abutting region 43d deep in the hole 43c. The drive-source mounting portion 43 also has bearings 35.

Figure 5:
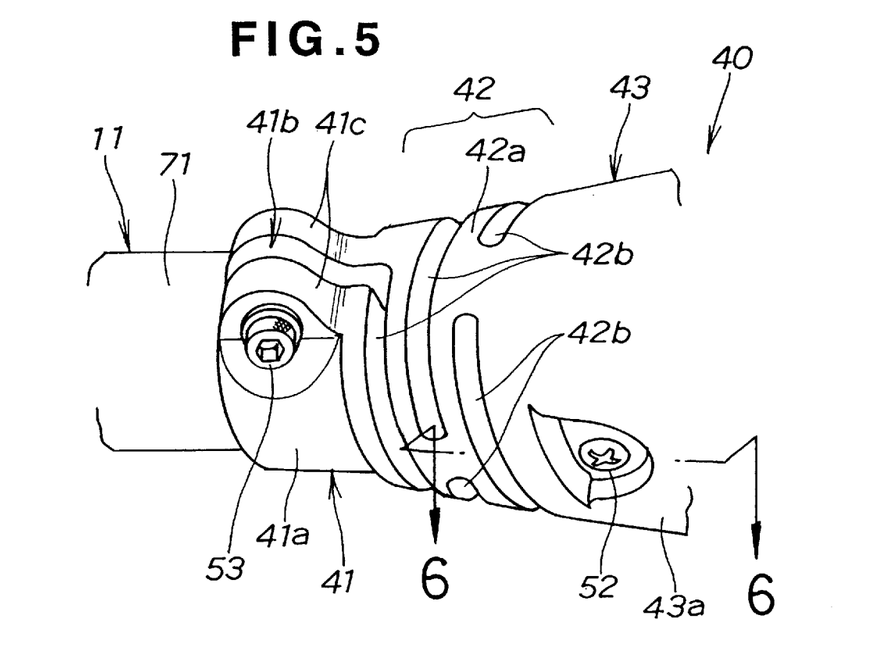
FIG. 5 is a perspective view of the clutch case shown in FIG. 4.

The loosely-fitting hole 43c is provided for receiving the one end portion 11a of the handling rod 11, inserted in the clutch case 40 via the handling-rod mounting portion 41, in a loose-fitting engagement such that the one end portion 11a is slid able in the axial direction. The hole 43c tapers off in a direction toward the abutting region 43d. The one end portion 11a of the handling rod 11 can abut at its end surface 11b against the abutting region 43d deep in the hole 43c of the inner cylindrical portion 43b. Reference numeral 36 in the figure represents a locking ring 36. The handling-rod mounting portion 41 has an axial slit 41b formed in its cylindrical body 41a (FIG. 5). Details of the mounting portion 41 will be discussed later in relation to FIG. 8.

As best seen in FIG. 5, the flexible coupling portion 42 of the clutch case 40 has a plurality of rows of circumferential slits 42b at predetermined axial intervals. Each of the circumferential slits 42b is a through hole communicating with an axial through-hole 42c of the flexible coupling portion 42 and elongated in the circumferential direction of a cylindrical wall 42a of the coupling portion 42; each of the circumferential slits 42b extends only part of the circumference of the cylindrical wall 42a. These slits 42b are staggered along the axial direction of the cylindrical wall 42a. Thus, in an imaginary sectional view of the flexible coupling portion 42 drawn by cutting the coupling portion 42 crosswise through an area where two circumferential slits 42b are present, the two circumferential slits 42b are symmetrical with each other about the axial centerline of the cylindrical wall 42a. The provision of these circumferential slits 42b allows the coupling portion 42 to have desired flexibility.

Figure 6:
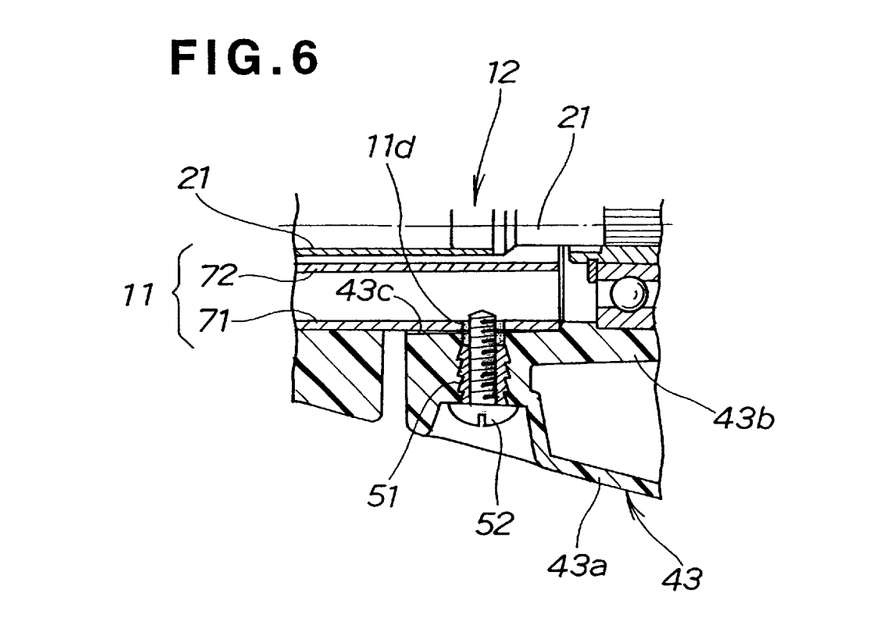
FIG. 6 is a sectional view taken along the 6—6 line of FIG. 5.

FIG. 6 is a sectional view taken along the 6—6 line of FIG. 5, which shows a peripheral area of the drive-source mounting portion 43 where an insert nut 51 is embedded to open into the interior of the mounting portion 43 and a screw 52 is driven through the insert nut 51. Specifically, the handling rod 11 includes an inner pipe portion 72, and an outer pipe portion 71 having an axial through-hole 11d. The screw 52 driven through the insert nut 51 into the axial through-hole lid of the handling rod 11 functions to prevent the handling rod 11 from accidentally disconnecting from the drive-source mounting portion 43. The disconnection-preventing screw 52 may be replaced with a bolt, rivet or the like having a similar disconnection-preventing function.

Figure 7:
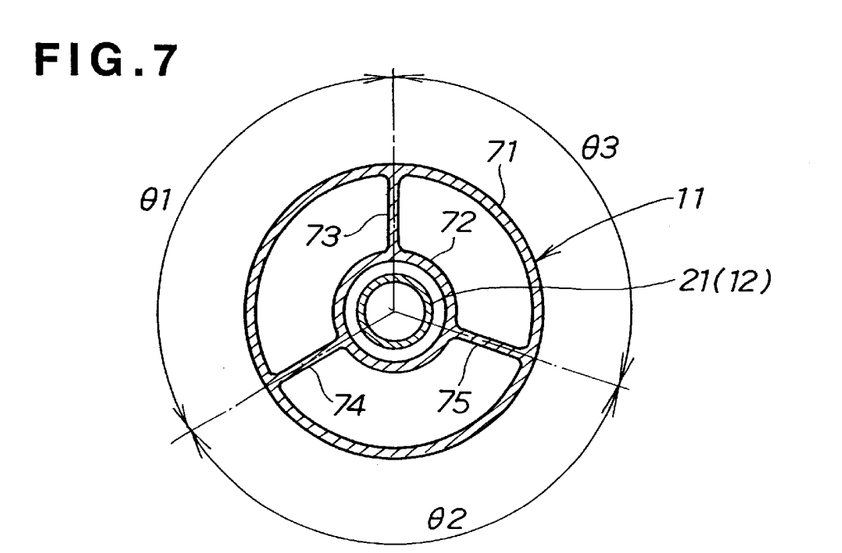
FIG. 7 is a sectional view of the handling rod taken along the 7—7 line of FIG. 4.

FIG. 7 is a sectional view of the handling rod 11 taken along the 7—7 line of FIG. 4. In the handling rod 11, the inner pipe portion 72 extends through the interior of the outer pipe portion 71, and these inner and outer pipe portions 72 and 71 are interconnected via three radial ridges or stays 73, 74 and 75. The inner and outer pipe portions 72, 71 and radial stays 73, 74, 75 are formed integrally as a one-piece component part. Namely, the handling rod 11 is substantially in the form of a dual pipe structure that has a circular section and that has the inner and outer pipe portions 72 and 71 interconnected via the stays 73, 74 and 75 in concentric relation to each other. The three stays 73, 74 and 75 will hereinafter be called a first stay 73, second stay 74 and third stay 75, respectively. In the handling rod 11, an angle θ1 formed by the first and second stays 73 and 74 is set to be greater than 60° but smaller than 120°, an angle θ2 formed by the second and third stays 74 and 75 is set to 120°, and an angle θ3 formed by the third and first stays 75 and 73 is set to the remaining angle (i.e. 360°−(θ1+θ2); namely, the three stays 73, 74 and 75 are arranged about the axial center of the handling rod 11 at unequal angular intervals.

Figure 8:
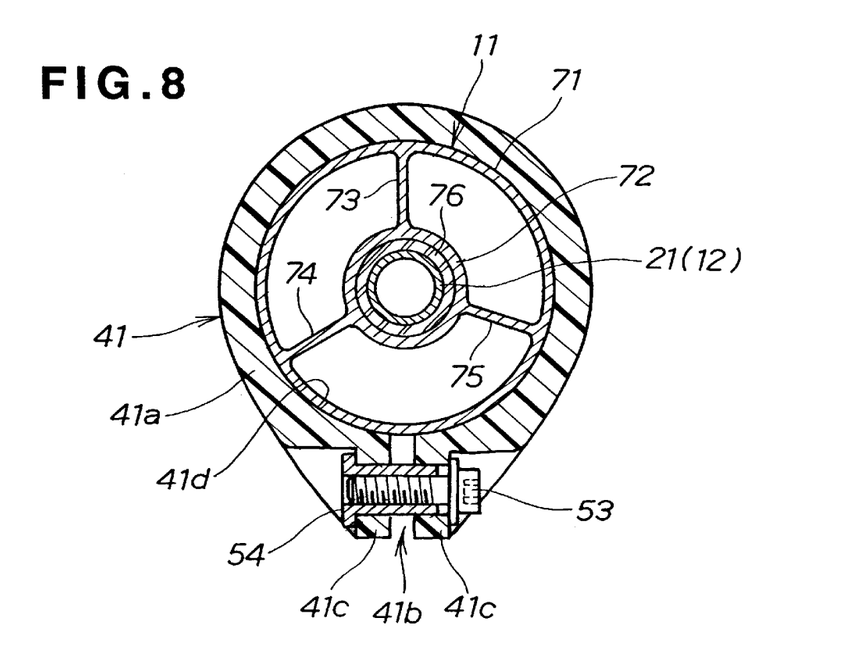
FIG. 8 is a sectional view taken along the 8—8 line of FIG. 4, which particularly shows how the handling rod and handling-rod mounting portion are coupled with each other.

FIG. 8 is a sectional view taken along the 8—8 line of FIG. 4, which shows how the handling rod 11 is coupled with the handling-rod mounting portion 41. As shown, the drive shaft 12 is passed through the inner pipe portion 72 of the handling rod 11 and supported via a bushing 76.

The handling-rod mounting portion 41 is generally in the form of a cylinder 41a having a slit 41b and a pair of flanges 41c opposed to each other with the slit 41b interposed therebetween. The outer pipe portion 71 of the handling rod 11 is fitted in an axial through-hole 41d of the cylinder 41a, and the opposed flanges 41c are held together by means of a bolt 53 so that the one end portion of the outer pipe portion 71 is frictionally secured to the inner surface of the handling-rod mounting portion 41.

Figure 9:
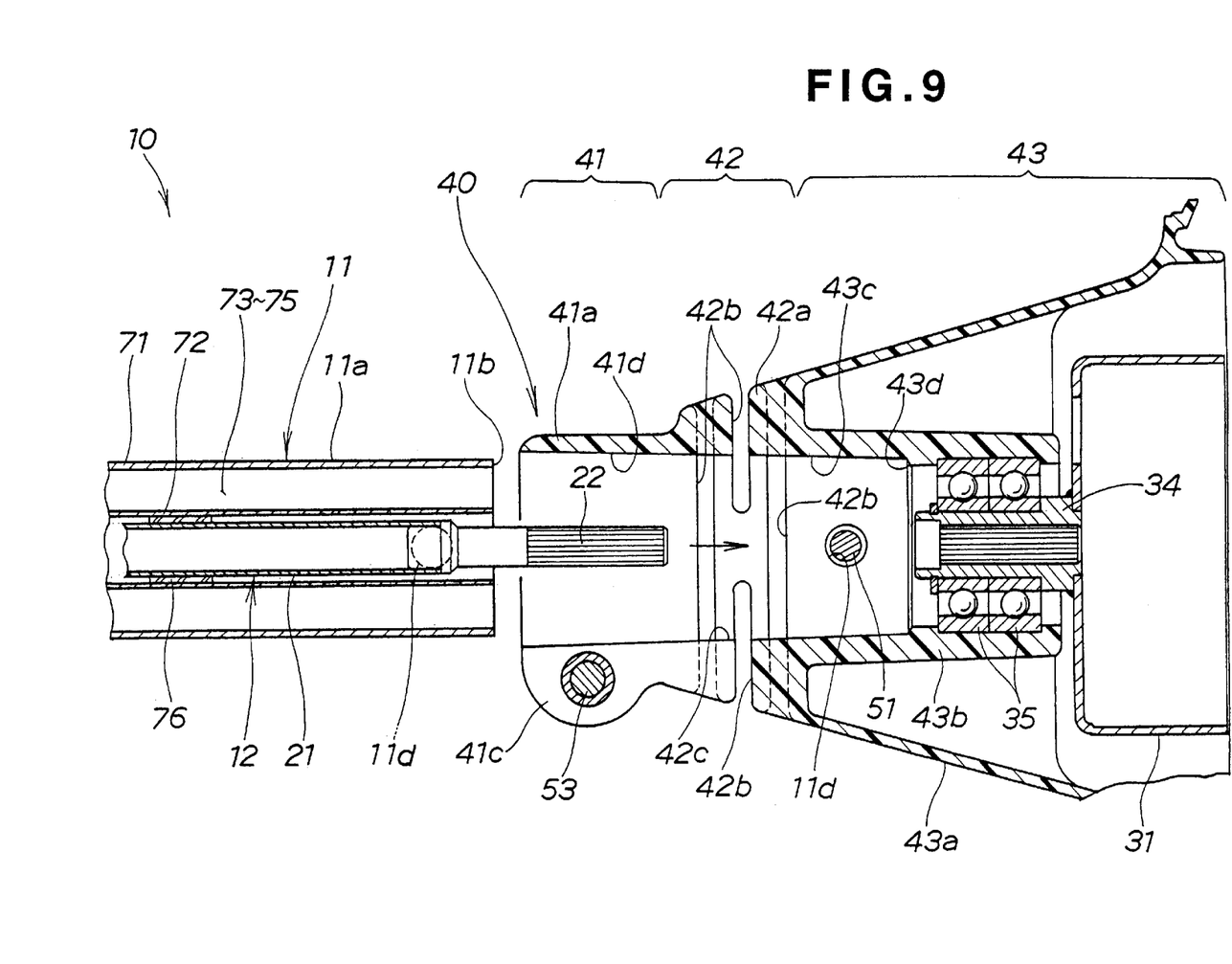
FIG. 9 is a sectional view corresponding to FIG. 4, which shows the handling rod and clutch case in a non-coupled state just for clarity of illustration.

FIG. 9 is an exploded sectional view corresponding to FIG. 4, which shows the handling rod 11 and clutch case 40 in a non-coupled state just for clarity of illustration. As shown, the axial through-hole 41d of the handling-rod mounting portion 41, axial through-hole 42c of the flexible coupling portion 42 and axial loosely-fitting hole 43c of the drive-source mounting portion 43 together form an axially-continuous hole tapering off toward the abutting region 43d.

When the one end portion 11a of the handling rod 11 is inserted via the axial through-hole 41d, through the axial through-hole 42c, into the loosely-fitting hole 43c in a direction indicated by a right arrow in FIG. 9, the end surface 11b of the handling rod 11 abuts against the abutting region 43d that is a stepped end surface formed deep in the loosely-fitting hole 43c of the drive-source mounting portion 43. Note that the end surface 11b is a flat surface perpendicular to the axis of the rod 11. The loosely-fitting hole 43c is tapered to progressively decrease in diameter in the direction toward the drive source unit 13, and its deepest portion adjacent to the abutting end surface 43d has a diameter slightly greater than the outer diameter of the outer pipe portion 71 of the handling rod 11.

The clutch case 40 constructed in the above-described manner operates as follows.

In the instant embodiment, the clutch case 40 is characterized in that the function of supporting the drive source unit 13 and the function of attenuating vibrations transmitted from the drive source unit 13 to the handling rod 11 are performed independently of each other; namely, the clutch case 40 performs the drive-source supporting function and vibration isolation function separately without an operating correlation between the two functions.

More specifically, the drive-source mounting portion 43 can be supported in the axial direction with the end surface 11b of the handling rod 11 abutting against the abutting end surface 43d of the mounting portion 43. Thus, the drive source unit 13 can be supported by the end surface 11b of the handling rod 11 via the drive-source mounting portion 43. Note that the drive-source mounting portion 43 can be reliably prevented from accidentally disconnecting from the handling rod 11 because it is coupled to the rod 11 via the flexible coupling portion 42 and handling-rod mounting portion 41 constructed in the above-described manner.

Further, since the loosely-fitting hole 43c has such a diameter as to receive the one end portion 11a of the handling rod 11 for axial sliding movement, there is formed a slight gap between the outer peripheral surface of the handling rod 11 and the inner wall surface of the drive-source mounting portion 43 defining the loosely-fitting hole 43c. The slight gap allows the drive source unit 13 to vibrate within certain limits about the one end portion 11a of the rod 11 supporting the unit 13; that is, the slight gap performs the vibration isolation function. Because the drive source unit 13 is axially supported by the end surface 11b of the handling rod 11 as noted above, there is no need for the flexible coupling portion 42 to support the unit 13, so that the flexible coupling portion 42 can fully perform its vibration attenuation function independently of the drive-source supporting function.

In the above-described manner, the instant embodiment can significantly reduce the undesired vibrations that are transmitted from the drive source unit 13 to the handling rod 11 while at the same time allowing the rod 11 to reliably support the unit 13.

In the above-described embodiment, the one end portion 11a of the handling rod 11 may be coupled with the handling-rod mounting portion 41 using any other desired construction than that shown in FIG. 8. Further, the flexible coupling portion 42 may be constructed in any other suitable manner rather than being limited to the construction of FIG. 5 having the plurality of circumferential slits 42b, as long as the coupling portion 42 can have such flexibility as to effectively attenuate of the vibrations of the drive source unit 13. For example, the flexible coupling portion 42 may be shaped like bellows. Further, the disconnection-preventing screw or other type of locking member 52 may be dispensed with as desired.

The present disclosure relates to the subject matter of Japanese Patent Application No. 2001-056528, filed Mar. 1, 2001 the disclosure of which is expressly incorporated herein by reference in its entirety.

What is claimed is:

1. A plant cutter apparatus comprising:
   a tubular handling rod having a first end portion and a second end portion;
   a drive shaft extending through the handling rod and mounted for undergoing rotation;
   a drive source unit mounted on the first end portion of the handling rod for rotationally driving the drive shaft;
   a cutter blade mounted on the second end portion of the handling rod and connected to the drive shaft for rotation therewith; and
   a clutch case having a first mounting portion connected to the first end portion of the handling rod, a flexible coupling portion extending from the first mounting portion toward the drive source unit, and a second mounting portion extending from the flexible coupling portion and connected to the drive source unit, the flexible coupling portion having an axial through-hole and a plurality of circumferential slits each formed in portion of a circumference of the flexible coupling portion and communicating with the axial through-hole, the circumferential slits being staggered along a longitudinal axis of the flexible coupling portion, the second mounting portion having an axial fitting hole for receiving the first end portion of the handling rod so that the first end portion of the handling rod is axially slidable therein and an abutment formed in the fitting hole for abutting engagement with an end surface of the first end portion of the handling rod, the fitting hole being tapered in a direction toward the abutment of the second mounting portion, and the first mounting portion, the flexible coupling portion and the second mounting portion extending sequentially along an axis of the drive shaft when viewed in a direction from the cutting blade toward the drive source unit.

2. A plant cutter apparatus according to claim 1; wherein the clutch case comprises a one-piece molded structure of synthetic resin material.

3. A plant cutter apparatus according to claim 1; wherein the fitting hole of the second mounting portion receives the first end portion of the handling rod with an annular gap defined therebetween to allow the drive source unit to vibrate about the end surface of the first end portion of the handling rod within a range of the annular gap.

4. A plant cutter apparatus according to claim 3; wherein the clutch case has a first axial through-hole the first mounting portion and a second axial through-hole formed in the flexible coupling portion, the first and second axial through-holes and the fitting hole of the second mounting portion together forming an axially continuous bole tapering in a direction toward the abutment of the second mounting portion.

5. A plant cutter apparatus according to claim 4; wherein the first mounting portion of the clutch case is generally cylindrical-shaped and has an axial slit communicating with the first axial through-hole and a pair of flanges opposed to each other with the axial slit interposed between.

6. A plant cutter apparatus according to claim 5; further comprising connecting means for connecting the flanges together so that the first end portion of the handling rod is frictionally secured to an inner peripheral surface in the first through-hole of the first mounting portion.

7. A plant cutter apparatus according to claim 6; wherein the connecting means comprises a bolt.

8. A plant cutter apparatus according to claim 7; wherein the second mounting portion has a radial hole opening at one end to the fitting hole, the first end portion of the handling rod having a radial hole axially aligned with radial hole of the second mounting portion; and wherein the clutch case has a disconnection-preventing member extending through the radial hole of the second mounting portion into the radial hole of the handling rod to prevent accidental disconnection of the handling rod from the second mounting portion.

9. A plant cutter apparatus according to claim 8; wherein the clutch case comprises a one-piece molded structure of synthetic resin material having an insert nut embedded therein so as to form the radial hole of the second mounting portion; and wherein the disconnection-preventing member comprises a screw threaded through the insert nut and received in the radial hole of the handling rod.

10. A plant cutter apparatus according to claim 6; wherein the second mounting portion has a radial hole opening at one end to the fitting hole, the first end portion of the handling rod having a radial hole axially aligned with radial hole of the second mounting portion; and wherein the clutch case has a disconnection-preventing member extending through the radial hole of the second mounting portion into the radial hole of the handling rod to prevent accidental disconnection of the handling rod from the second mounting portion.

11. A plant cutter apparatus according to claim 10; wherein the clutch case comprises a one-piece molded structure of synthetic resin material having an insert nut embedded therein so as to form the radial hole of the second mounting portion; and wherein the disconnection-preventing member comprises a screw threaded through the insert nut and received in the radial hole of the handling rod.

12. A plant cutter apparatus comprising:

a tubular handling rod having a first end portion and a second end portion;

a drive shaft extending through the handling rod and mounted for undergoing rotation;

a drive source unit mounted on the first end portion of the handling rod for rotationally driving the drive shaft;

a cutter blade mounted on the second end portion of the handling rod and connected to the drive shaft for rotation therewith; and a clutch case having a first mounting portion connected to the first end portion of the handling rod, a flexible coupling portion extending from the first mounting portion toward the drive source unit, a second mounting portion extending from the flexible coupling portion and connected to the drive source unit, and an axial hole extending into the second mounting portion successively through the first mounting portion and the flexible coupling portion and receiving therein the first end portion of the handling rod, the flexible coupling portion having an axial through-hole forming part of the axial hole of the clutch case and a plurality of circumferential slits each formed in a portion of a circumference of the flexible coupling portion and communicating with the axial through-hole, the circumferential slits being staggered along a longitudinal axis of the flexible coupling portion, the second mounting portion having an axial fitting hole forming part of the axial hole and loosely receiving therein the first end portion of the handling rod with a gap defined therebetween and an abutment formed in the fitting hole for abutting engagement with an end surface of the first end portion of the handling rod, the fitting hole being tapered in a direction toward the abutment of the second mounting portion, the gap defined between the handling rod and the fitting hole of the second mounting portion allowing the drive source unit to vibrate about the end surface of the first end portion of the handling rod within a range of the gap.

13. A plant cutter apparatus according to claim 12; wherein the clutch case comprises a one-piece molded structure of synthetic resin material.

14. A plant cutter apparatus comprising:

a tubular member having a first end portion and a second end portion;

a drive shaft extending through the tubular member and mounted for undergoing rotation;

a drive source unit mounted on the first end portion of the tubular member for rotationally driving the drive shaft;

a cutter blade connected to the drive shaft for rotation therewith; and a clutch case comprised of a one-piece molded structure having a first mounting portion connected to the first end portion of the tubular member, a second mounting portion connected to the drive source unit, and a flexible coupling portion disposed between the first mounting portion and the second mounting portion.

15. A plant cutter apparatus according to claim 14; wherein the second mounting portion of the clutch case has a fitting hole receiving therein the first end portion of the tubular member with an annular gap defined therebetween to allow the drive source unit to vibrate about an end surface of the first end portion of the tubular member within a range of the annular gap.

16. A plant cutter apparatus according to claim 15; wherein the second mounting portion of the clutch case has an abutment formed in the fitting hole for abutting engagement with the end surface of the first end portion of the tubular member.

* * * * *